(12) United States Patent
Merchant et al.

(10) Patent No.: US 7,310,664 B1
(45) Date of Patent: Dec. 18, 2007

(54) UNIFIED, CONFIGURABLE, ADAPTIVE, NETWORK ARCHITECTURE

(75) Inventors: Shehzad T. Merchant, Mountain View, CA (US); Manish M. Rathi, San Jose, CA (US); Victor C. Lin, Fremont, CA (US); Vipin K. Jain, Santa Clara, CA (US); Jia-Ru Li, San Jose, CA (US); Amit K. Maitra, Cupertino, CA (US); Matthew R. Peters, Santa Cruz, CA (US); Derek H. Pitcher, Los Altos, CA (US); Balaji Srinivasan, Fremont, CA (US)

(73) Assignee: Extreme Networks, Santa Clara, CA (US)

( * ) Notice: Subject to any disclaimer, the term of this patent is extended or adjusted under 35 U.S.C. 154(b) by 242 days.

(21) Appl. No.: 10/773,487

(22) Filed: Feb. 6, 2004

(51) Int. Cl.
*G06F 15/173* (2006.01)
(52) U.S. Cl. ...................................... 709/220
(58) Field of Classification Search ................ 709/220, 709/223, 230
See application file for complete search history.

(56) References Cited

U.S. PATENT DOCUMENTS

| | | | |
|---|---|---|---|
| 5,265,005 A | | 11/1993 | Schmidt et al. |
| 5,598,412 A | * | 1/1997 | Griffith et al. ............... 370/352 |
| 5,659,604 A | | 8/1997 | Beckmann |
| 6,137,802 A | * | 10/2000 | Jones et al. .................. 370/401 |
| 6,363,489 B1 | | 3/2002 | Comay et al. |
| 6,400,925 B1 | | 6/2002 | Tirabassi et al. |
| 6,459,557 B1 | * | 10/2002 | Haensgen et al. .......... 361/93.2 |
| 6,584,113 B1 | * | 6/2003 | Manduley et al. ........... 370/433 |
| 6,654,588 B2 | * | 11/2003 | Moskowitz et al. ........ 434/350 |
| 6,687,833 B1 | | 2/2004 | Osborne et al. |
| 7,140,040 B2 | | 11/2006 | McBrearty et al. |
| 7,159,237 B2 | | 1/2007 | Schneier et al. |
| 7,181,530 B1 | | 2/2007 | Halasz et al. |
| 2001/0046224 A1 | | 11/2001 | Ryu |
| 2002/0066034 A1 | | 5/2002 | Schlossberg et al. |
| 2002/0197978 A1 | | 12/2002 | Zavidniak |
| 2003/0033413 A1 | | 2/2003 | Willson et al. |

(Continued)

OTHER PUBLICATIONS

Funk Software, Inc., "Product News: RADIUS/AAA Solutions on Wireless Networks", Sep. 30, 2002, available at: http://web.archive.org/web/20040215160450/www.funk.com/radius/News/wireless.asp.

(Continued)

*Primary Examiner*—David Y. Eng
(74) *Attorney, Agent, or Firm*—Howrey LLP

(57) ABSTRACT

A network switch having a unified, adaptive management paradigm for wireless network devices is disclosed. The switch includes configurable ports for connecting devices. A software application running on the switch allows a network administrator to selectively configure each port to support either a wired device or wireless device. Configuration information and software images that are needed for operation of the wireless device are associated with the port. When a wireless device is first plugged into the switch port, it downloads its configuration directly from the switch port. By storing the configuration information and images at the switch and automatically downloading them to the wireless devices, the task of configuring the devices is greatly simplified for the network administrator. This is particularly advantageous in heterogeneous network environments that support both wired and wireless devices, and where wireless device are readily moved to different ports.

32 Claims, 15 Drawing Sheets

U.S. PATENT DOCUMENTS

| | | |
|---|---|---|
| 2003/0058095 A1 | 3/2003 | Satoh |
| 2003/0065934 A1 | 4/2003 | Angelo et al. |
| 2003/0135762 A1 | 7/2003 | Macaulay |
| 2003/0142641 A1 | 7/2003 | Sumner et al. |
| 2004/0252837 A1 | 12/2004 | Harvey et al. |

OTHER PUBLICATIONS

Funk Software, Inc., *"Data Sheet: Steel-Belted Radius/Global Enterprise Edition"*, Feb. 4, 2004, avail. at: http://web.archive.org/web/20040204113333/www.funk.com/radius/enterprise/gee_ds.asp.

Funk Software, Inc., *"Data Sheet: Steel-Belted Radius/GEE Appliance"*, Feb. 4, 2004, avail. at: http://web.archive.org/web/20040204113816/www.funk.com/radius/enterprise/nei_gee_ds.asp.

Funk Software, Inc., *"White Paper: Centralized Remote Access Authentication with RADIUS"*, Feb. 4, 2004, avail. at: http://web.archive.org/web/20040215054514/www.funk.com/radius/Solns/rad_wp.asp.

Funk, P. et al., *"EAP Tunneled TLS Authentication Protocol (EAP-TTLS)"*, Mar. 2002, avail. at: http://www.ietf.org/proceedings/02mar/slides/eap-1/sld001.htm.

Blunk, L. et al., *"PPP Extensible Authentication Protocol (EAP)"*, RFC 2284, Network Working Group, Mar. 1998, avail. at: http://www.faqs.org/rfcs/rfc2284.html.

Hussain, S., *"How to Convert Ether Type Packet to 802.11"*, Apr. 18, 2002, avail. at: http://lists.linux-wlan.com/pipermail/linux-wlan-devel/2002-April/001036.html.

Zorn, G., *"Deriving Keys for Use With Microsoft Point-to-Point Encryption (MPPE)"*, RFC 3079, Network Working Group, Mar. 2001, avail. at: http://www/faqs.org/rfcs/rfc3079.html.

Calhoun, P. et al., *"Extensible Authentication Protocol Support in RADIUS"*, RFC 2138, RADIUS Working Group, May 8, 1998, avail. at: http:/www.freeradius.org/rfc/draft-ietf-radius-eap-05.txt.

Zorn, G., *"Microsoft Vendor-Specific RADIUS Attributes"*, RFC 2548, Network Working Group, Mar. 1999, avail. at: http://www.faqs.org/rfcs/rfc2548.html.

Yongguang Zhang and Wenke Lee, "Intrusion Detection in Wireless Ad-Hoc Networks," ACM MOBICOM, 2000, pp. 275-283.

Sonali Bhargave and Dharma Agrawal, "Security Enhancements in AODV protocol for Wireless Ad Hoc Networks," IEEE 2001, pp. 2143-2147.

Nikita Borisov, Ian Goldberg, and David Wagner, "Intercepting Mobile Communications: The Insecurity of 802.11," 2001, pp. 1-13.

W. Arbaugh, N. Shanker, Y.C. Justin Wan, "Your 802.11 Wireless Network has No Clothes," Mar. 30, 2001, pp. 1-13.

* cited by examiner

| | Wireless Port Configuration | | | | | | | | | |
|---|---|---|---|---|---|---|---|---|---|---|
| | Port Number | Hardware Version | Serial Number | Status | IP Address | Location | Timeout | Health Check | Bridging | MAC Address |
| Configuration | 1:1 | - | - | DIS | 192.168.0.100 | Location Unknown | 600 | on | on | 00:00:00:00:00:00 |
| ○ IP Forwarding | 1:2 | - | - | DIS | 192.168.0.101 | Location Unknown | 600 | on | on | 00:00:00:00:00:00 |
| ○ Ports | 1:3 | - | - | DIS | 192.168.0.102 | Location Unknown | 600 | on | on | 00:00:00:00:00:00 |
| ○ Quality of Service | 1:4 | - | - | EN | 10.211.32.116 | Location Unknown | 600 | on | on | 00:00:00:00:00:00 |
| ○ SNMP | 1:5 | - | - | DIS | 192.168.0.104 | Location Unknown | 600 | on | on | 00:00:00:00:00:00 |
| ○ Spanning Tree | 1:6 | - | - | DIS | 192.168.0.105 | Location Unknown | 600 | on | on | 00:00:00:00:00:00 |
| ○ RADIUS | 1:7 | - | - | DIS | 192.168.0.106 | Location Unknown | 600 | on | on | 00:00:00:00:00:00 |
| ○ Wireless Port | 1:8 | - | - | DIS | 192.168.0.107 | Location Unknown | 600 | on | on | 00:00:00:00:00:00 |
| ○ Wireless Interface | | | | | | | | | | |
| | 1:48 | - | - | DIS | 192.168.0.147 | Location Unknown | 600 | on | on | 00:00:00:00:00:00 |

○ Spanning Tree
○ RADIUS
○ Wireless Port
○ Wireless Interface
○ Security Profile
○ RF Profile
○ POE Ports
○ POE Power
○ Switch
○ User Accounts
○ Virtual LAN Statistics
Support
Logout Configure Wireless Port Parameters  65

Port Name  [1.1 ▽]  [Get]

| IP Address | Location | Timeout | Health Check | Bridging |
|---|---|---|---|---|
| 192.168.0.100 | Unknown Location | 600 | on ▽ | on ▽ |

[Submit]

Manage Wireless Port  67

| Port Number | Management Action |
|---|---|
| [1.1 ▽] | ○ Reset  ○ Enable  ○ Disable  ○ Clear Counter  ○ Clear Logs |

*FIG. 5*

RF Profile

Create Profile [_____] From [DEFAULT_BG ▽] [Create]

Delete Profile [DEFAULT_G ▽] [Delete]

Configure RF Profile

Profile Name [DEFAULT_A ▽] [Get]

Current Interfaces: 1:1:1, 1:2:1, 1:3:1, 1:4:1, 1:5:1, 1:6:1, 1:7:1, 1:8:1, 1:9:1, 1:10:1, 1:11:1, 1:12:1, 1:13:1, 1:14:1, 1:15:1, 1:16:1, 1:17:1, 1:18:1, 1:19:1, 1:20:1, 1:21:1, 1:22:1, 1:23:1, 1:24:1, 1:25:1, 1:26:1, 1:27:1, 1:28:1, 1:29:1, 1:30:1, 1:31:1, 1:32:1, 1:33:1, 1:34:1, 1:35:1, 1:36:1, 1:37:1, 1:38:1, 1:39:1, 1:40:1, 1:41:1, 1:42:1, 1:43:1, 1:43:2, 1:44:1, 1:45:1, 1:46:1, 1:47:1, 1:48:1

| Field | Value | Unit |
|---|---|---|
| Maximum No. of Clients | 64 | |
| Mode | A | |
| ESS Name | DEFAULT_ESS | |
| Beacon Interval | 40 | Kusec |
| DTIM | 2 | packets |
| Fragmentation Length | 2345 | bytes |
| RTS Threshold | 2330 | bytes |
| Preamble | ⦿ short  ○ long | |
| Short Retry | 4 | |
| Long Retry | 7 | |

[Submit]

Sidebar:
- Configuration
  - ○ IP Forwarding
  - ○ Ports
  - ○ Quality of Service
  - ○ SNMP
  - ○ Spanning Tree
  - ○ RADIUS
  - ○ Wireless Port
  - ○ Wireless Interface
  - ⋮
  - ○ Spanning Tree
  - ○ RADIUS
  - ○ Wireless Port
  - ○ Wireless Interface
  - ○ Security Profile
  - ○ RF Profile
  - ○ POE Ports
  - ○ POE Power
  - ○ Switch
  - ○ User Accounts
  - ○ Virtual LAN
- Statistics
- Support
- Logout

*FIG. 6*

Security Profile

Create Profile [ ]    From [Unsecure ▽] [Create]

Delete Profile [dot1x-sec ▽] [Delete]

Configuration
- IP Forwarding
- Ports
- Quality of Service
- SNMP
- Spanning Tree
- RADIUS
- Wireless Port
- Wireless Interface

. . .

- Spanning Tree
- RADIUS
- Wireless Port
- Wireless Interface
- Security Profile
- RF Profile
- POE Ports
- POE Power
- Switch
- User Accounts
- Virtual LAN

Statistics

Support

Logout

Configure Security Profile

Profile Name [Unsecure ▽] [Get]

Current Interfaces: 1:1:1, 1:1:2, 1:2:1, 1:2:2, 1:3:1, 1:3:2, 1:4:1, 1:5:1, 1:5:2, 1:6:1, 1:6:2, 1:7:1, 1:7:2, 1:8:1, 1:8:2, 1:9:1, 1:9:2, 1:10:1, 1:10:2, 1:11:1, 1:11:2, 1:12:1, 1:12:2, 1:13:1, 1:13:2, 1:14:1, 1:14:2, 1:15:1, 1:14:2, 1:16:1, 1:16:2, 1:17:1, 1:17:2, 1:18:1, 1:18:2, 1:19:1, 1:19:2, 1:20:1, 1:20:2, 1:21:1, 1:21:2, 1:22:1, 1:22:2, 1:23:1, 1:23:2, 1:24:1, 1:24:2, 1:25:1, 1:25:2, 1:26:1, 1:26:2, 1:27:1, 1:27:2, 1:28:1, 1:28:2, 1:29:1, 1:29:2, 1:30:1, 1:30:2, 1:31:1, 1:31:2, 1:32:1, 1:32:2, 1:33:1, 1:33:2, 1:34:1, 1:34:2, 1:35:1, 1:35:2, 1:36:1, 1:36:2, 1:37:1, 1:37:2, 1:38:1, 1:38:2, 1:39:1, 1:39:2, 1:40:1, 1:40:2, 1:41:1, 1:41:2, 1:42:1, 1:42:2, 1:43:1, 1:43:2, 1:44:1, 1:44:2, 1:45:1, 1:45:2, 1:46:1, 1:46:2, 1:47:1, 1:47:2, 1:48:1, 1:48:2

SSID In Beacon [on ▽]
Encryption Length [128 ▽]
Web Netlogin [off ▽]

Configure WEP

WEP Authentication [off ▽]
WEP VLAN [Default ▽]
Configure WEP Keys

Configure Dot1x

Dot1x Authentication [none ▽]
Dot1x Authentication Suite ⦿ 802.1X EAP
                      ○ Pre-Shared Key
                         ○ Key [ ]
                         ○ Password [ ]
                         VLAN [ ▽]

Multicast Cypher [WEP ▽]

Reauth Period [3600]
Group Udate Timer [15]
Pairwise Update Timer [15]

[Submit]

*FIG. 7*

MAC Filter Management  70

Create MAC Filter [          ]  [Create]

Delete MAC Filter [std-filter ▽]  [Delete]

Set Default Filter Action  ○ Permit   ○ Deny  [Submit]

Configure MAC Filter

Configure MAC Filter [std-filter ▽]  [Get]

| Learned | Action | Managed |
|---------|--------|---------|
|         | Add Permit → |  |
| MAC [    ] | Add Deny → |  |
|         | ← Remove |  |

| Bytes | 0 | 1 | 2 | 3 |
|---|---|---|---|---|
| 0 | 0x99 | AP_Announce | Length | |
| 4 | Hardware ID[0..3] | | | |
| 8 | Hardware ID[4..7] | | | |
| 12 | Hardware ID[8..11] | | | |
| 16 | Hardware ID[12..15] | | | |
| 20 | HW Major Rev. | HW Minor Rev. | HW Build# | |
| 24 | Boot Major Rev. | Bootrom Minor Rev. | Bootrom Build# | |
| 28 | Serial number[0..3] | | | |
| 32 | Serial number[4..7] | | | |
| 36 | Serial number[8..9] | | AP Ethernet MAC[0..1] | |
| 40 | AP Ethernet MAC[2..5] | | | |
| 44 | HW_POST_STATUS | | | |
| 48 | HW_POST_OK | | | |

FIG. 13

| Bytes | 0 | 1 | 2 | 3 |
|---|---|---|---|---|
| 0 | 0x99 | Announce_Reply | Length | |
| 4 | AP IP Address | | | |
| 8 | AP IP Mask | Use_VLAN_TAG | VLAN Tag | |
| 12 | Default Gateway | | | |
| 16 | Switch IP Address | | | |
| 20 | AgentX Port | | Physical SW Port if_index | |
| 24 | Keep-Alive Period | Image Type | Reserved | |
| 28 | Boot URL | | | |
| 32 | Boot URL | | | |
| 36 | Boot URL | | | |

|   | Bytes | | | |
|---|---|---|---|---|
|   | 0 | 1 | 2 | 3 |
| 0 | 0x99 | Renew_Config | Length | |
| 4 | AP IP Address | | | |
| 8 | AP IP Mask | Use_VLAN_TAG | VLAN Tag | |
| 12 | Default Gateway | | | |
| 16 | Switch IP Address | | | |
| 20 | AgentX Port | | Physical SW Port index | |
| 24 | Keep-Alive Period | Reserved 8 | Reserved 16 | |

*FIG. 14*

|   | Bytes | | | |
|---|---|---|---|---|
|   | 0 | 1 | 2 | 3 |
| 0 | 0x99 | TFTP_OK | Length | |
| 4 | Image Type | Status | Retry # | Reserved |

*FIG. 15*

|   | Bytes | | | |
|---|---|---|---|---|
|   | 0 | 1 | 2 | 3 |
| 0 | 0x99 | AP_Keep_Alive | Length | |

*FIG. 16*

|   | Bytes | | | |
|---|---|---|---|---|
|   | 0 | 1 | 2 | 3 |
| 0 | 0x99 | AP_Reset | Length | |

*FIG. 17*

| | Wireless Port Configuration | | | | | | |
|---|---|---|---|---|---|---|---|
| Port Number | Interface Number | Status | Channel | Tx Speed | Power | RF Profile | Security Profile |
| 1:2 | 1 | Enabled | 0 | 54 | FULL | DEFAULT_A | Unsecure |
| 1:2 | 2 | Enabled | 0 | 11 | FULL | DEFAULT_BG | Unsecure |
| 1:3 | 1 | Enabled | 0 | 54 | FULL | DEFAULT_A | Unsecure |
| 1:3 | 2 | Enabled | 0 | 11 | FULL | DEFAULT_BG | Unsecure |
| 1:4 | 1 | Disabled | 6 | 54 | FULL | DEFAULT_A | Unsecure |
| 1:4 | 2 | Enabled | 0 | 11 | FULL | DEFAULT_BG | dot1x-sec |
| 1:5 | 1 | Enabled | 0 | 54 | FULL | DEFAULT_A | Unsecure |
| 1:5 | 2 | Enabled | 0 | 11 | FULL | DEFAULT_BG | Unsecure |
| 1:6 | 1 | Enabled | 0 | 54 | FULL | DEFAULT_A | Unsecure |
| 1:6 | 2 | Enabled | 0 | 11 | FULL | DEFAULT_BG | Unsecure |
| 1:48 | 2 | Enabled | 0 | 11 | FULL | DEFAULT_BG | Unsecure |

Configuration
- IP Forwarding
- Ports
- Quality of Service
- SNMP
- Spanning Tree
- RADIUS
- Wireless Port
- Wireless Interface

- Spanning Tree
- RADIUS
- Wireless Port
- Wireless Interface
- Security Profile
- RF Profile
- POE Ports
- POE Power
- Switch
- User Accounts
- Virtual LAN Statistics
Support
Logout Configure Wireless Interface Parameters Port Number [1.1 ▽]  Interface Number [1 ▽]  (Get)

| Channel | TxSpeed | Power | RF Profile | Security Profile |
|---|---|---|---|---|
| 0(AUTO) ▽ | 54 ▽ | FULL ▽ | DEFAULT_A ▽ | Unsecure ▽ |

(Submit)

Manage Wireless Interface

| Port Number | Interface Number | Management Action |
|---|---|---|
| 1.1 ▽ | 1 ▽ | ○ Enable  ○ Disable  ○ Reset |

(Submit)

FIG. 18

| | Client Management | | | | | | | | | | | |
|---|---|---|---|---|---|---|---|---|---|---|---|---|
| | Port Number 1.1 ▽ Interface Number 1 ▽ Get | | | | | | | | | | | |
| MAC | Wireless Port | Wireless Interface | State | Encryption Type | Auth Type | Auth Time | Signal Strength | ESS ID | VLAN ID | Bytes To | Bytes From |
| | 1:1 | 1 | | | | | 0 | | 0 | 0 | 0 |

Force Disassociation ▽ Force

Configuration
Statistics
○ Event Log
○ Wireless Event Log
○ Wireless Port
○ FDB
○ IP ARP
○ IP Configuration
○ IP Route
○ IP Statistics
○ Ports
○ Port Collisions
○ Port Errors
○ Port Utilization
○ Spanning Tree
○ Switch
○ Wireless Interface
○ Statistics Dot11
○ Wireless Interface
○ Statistics MIB2
○ Client Management
Support
Logout

FIG. 19

UNIFIED, CONFIGURABLE, ADAPTIVE, NETWORK ARCHITECTURE

RELATED APPLICATIONS

This application is related to U.S. patent application Ser. No. 10/774,079, entitled "Method and System For Location-Based Access Control In A Computer Network"; U.S. patent application Ser. No. 10/773,394, entitled "Apparatus, Method and System for Improving Network Security." Each of the foregoing applications is filed concurrently herewith, and owned in common by the assignee hereof. Moreover, each of these applications is fully incorporated by reference as though set forth in full. This application is also a parent of U.S. patent application Ser. No. 10/794,203, entitled "Method and System for Detecting and Preventing Access Intrusion in a Network filed Mar. 5, 2004.

FIELD OF THE INVENTION

The present invention relates generally to computer networks, and more specifically, to wireless local area networks (LANs).

BACKGROUND OF THE INVENTION

The emergence of wireless devices in computer networking environments has imposed a new set of problems for network and information technology (IT) administrators. First, in many instances, wireless devices are not easily integrated with existing networks that support wired devices. As a result, some wireless networks are installed and managed as separate network elements, i.e., administrators configure and manage wireless devices, such as wireless Access Points (APs), separately from their wired LAN counterparts, e.g., wired access switches.

In these heterogeneous networks, the wireless APs are configured independently of the wired network elements. Also, software upgrades for the wireless LAN APs are done independently of the wired LAN access switches, i.e., software images for the wireless LAN APs and for the wired LAN access switches are distinct and need to be managed and upgraded independently. Additionally, network troubleshooting involves troubleshooting the wired and wireless networks independently. Thus, in many ways, the wireless LAN APs are treated as separate network elements that require special and distinct configuration and management, separate from the wired LAN network elements. This makes the administration of the network cumbersome for the network administrator and prone to error.

Second, in known wireless LANs, each AP must be individually configured. This is time consuming in larger networks, such as enterprise networks where there may be a multitude of APs. A network administrator must configure each AP individually and then connect it to the network.

Another aspect of enterprise networks is that they often change. Networks expand and contract with the number users, i.e., network elements are frequently added and removed. Networks are also frequently relocated physically. This requires disconnecting network elements, moving them, and then reattaching them. Each time a wireless AP is moved in a conventional wireless network, it must be re-configured for its new location. This adds considerable expense and inconvenience when changing the physical layout of a network.

Accordingly, there is a need for a network architecture that reduces the administrative burden of managing and configuring wireless network devices.

SUMMARY OF THE INVENTION

It is an advantage of the present invention to provide a unified management paradigm for wired and wireless network devices. This is achieved by abstracting the configuration and management aspects of the wireless devices into the configuration and management functions of the wired network switch that the wireless devices are plugged into. Network software (an image) is automatically downloaded to wireless devices when they are plugged into the switch. By doing this, wireless devices do not need to be individually configured or updated by an administrator when they are installed on the network. They simply adapt to the configuration of the switch port to which they are connected. This also reduces the burden of moving APs to different ports within a network. Each time an AP is moved, it automatically reconfigures to the settings of the new port to which it is connected.

By unifying the treatment of wireless devices, such as LAN APs, with the configuration of network switch ports, the burden of administering wireless devices in a heterogeneous environment can be dramatically reduced. For example, under the unified management scheme disclosed herein, edge devices do not have to be individually managed and/or configured. Edge devices instead appear to administrators as switch ports or port extensions, and administrators can conveniently configure and/or upgrade software on one or more edge devices by simply configuring a switch port.

Moreover, integrated management of the wired and wireless infrastructure in an enterprise network can facilitate widespread deployment of wireless devices. The present invention provides capabilities for seamless management of such heterogeneous networks. The seamless management scheme disclosed herein can reduce operating costs, simplify upgrade procedures, ease fault detection and resolution, and thus potentially reduce the total cost of ownership of a network.

In accordance with an embodiment of the invention, a network switch includes a configurable port and a software application. The port is a network attachment point for an edge device. The software running on the switch allows a network administrator to selectively configure the port to support either a wired edge device or a wireless edge device. According to one aspect of the invention, the software application permits the administrator to enter configuration information for the wireless edge device and store it on the switch. The configuration information includes data that allows the wireless edge device to access the network, and it is associated with one or more switch ports. When the wireless edge device is connected to the port, the configuration information is automatically downloaded. Using this approach, the network administrator is relieved of having to independently manage and configure wireless network elements in a manner that is separate and distinct from how the wired switch ports and edge devices are managed.

According to another aspect of the invention, the switch includes a memory for storing a software image corresponding to the wireless edge device. The software image is code that is executable on the wireless edge device. When the edge device is connected to the port, the switch automatically downloads the image to the edge device, along with the configuration information. This aspect of the invention provides significant advantage in that it relieves a network administrator from having to individually upgrade wireless edge devices with software. Upgrading wireless edge device software requires only upgrading the switch or a backend server. This aspect of the invention also reduces the burden of moving APs to different ports within a network because each time an AP is moved, it automatically reconfigures to the settings of the new port to which it is connected.

Method counterparts to the above embodiment and various aspects of the invention are also provided. Other systems, methods, features, embodiments and advantages of the invention will be or will become apparent to one with skill in the art upon examination of the following figures and detailed description. It is intended that all such additional systems, methods, features, embodiments and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIGS. 5-8 show exemplary web pages included in the GUI shown in FIG. 3.

FIGS. 11-17 illustrate exemplary formats for messages sent between the edge devices and the network switch of FIG. 9.

FIGS. 18-19 show additional exemplary web pages included in the GUI shown in FIG. 4.

DETAILED DESCRIPTION

The description below, while illustrated and explained within the context of local area networks (LANs), can be applicable more generally to other types of networks and protocols.

Figure 1:
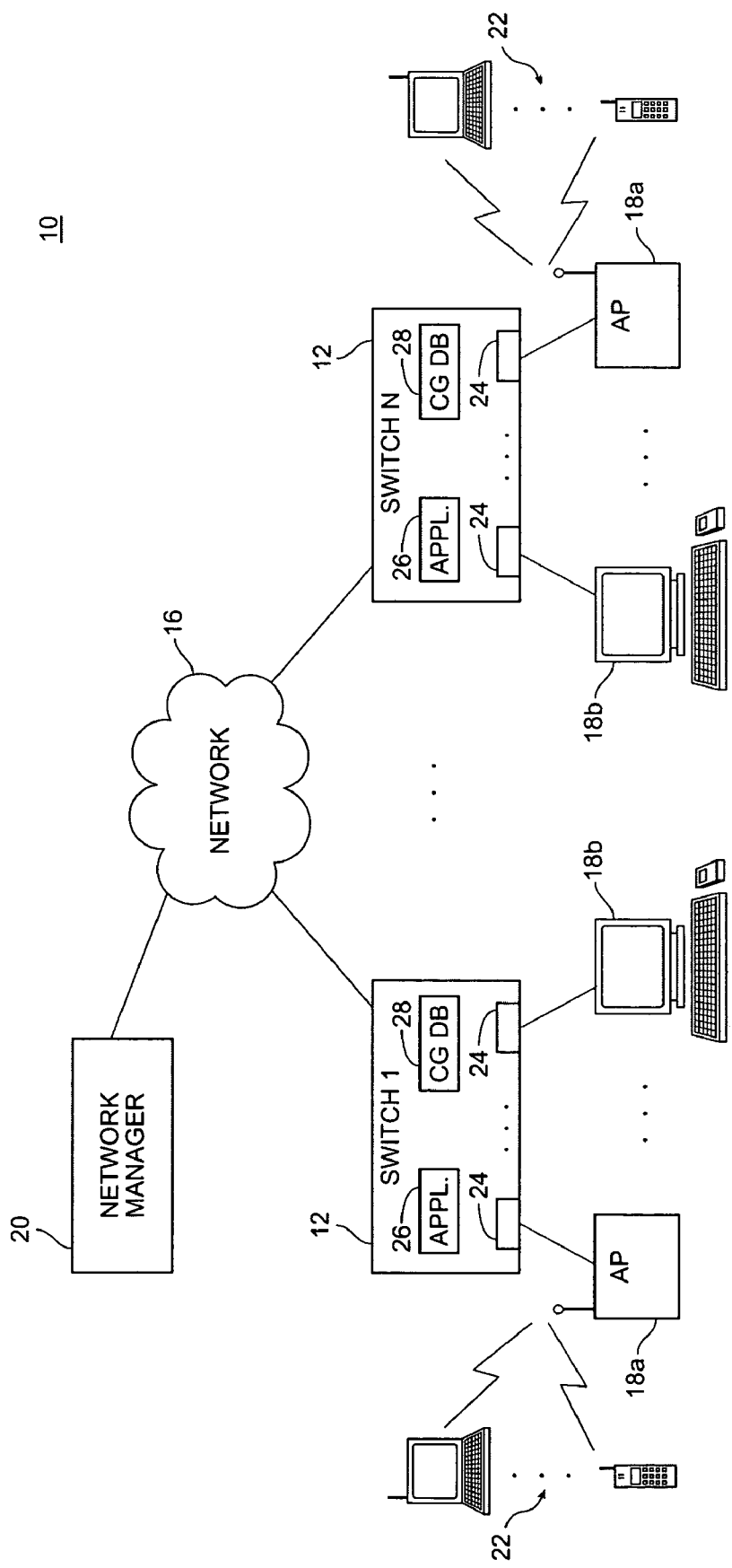
FIG. 1 is a conceptual diagram of an exemplary computer network in accordance with an embodiment of the present invention.

Turning now to the drawing, and in particular to FIG. 1, there is illustrated a network system 10 in accordance with an exemplary embodiment of the invention. The network architecture shown in FIG. 1 provides a unified, adaptive access paradigm for wired and wireless LAN access, management, and configuration. This is achieved by treating wireless edge devices 18a, such as wireless access points (APs), as extensions of the wired LAN switch port 24. The configuration and management of each AP 18a is abstracted to the configuration and management of the wired LAN access switch 12 that the AP 18a is plugged into.

Access points (APs) are network edge devices that allow end users to wirelessly connect their computers or other personal devices to LANs. These wireless edge devices have become increasingly popular with the establishment of industry standards, such as the IEEE 802.11 (Wi-Fi) standards, that specify their operational characteristics.

With a large number edge devices and wired user stations 18a-b spread in an enterprise network 16, managing the devices 18a-b becomes a burden. The unified network architecture disclosed herein simplifies network management by moving management functions into the switches 12, and/or into one or more backend network manager servers (NMSs) 20. From the administrator's perspective, the edge devices and wired stations 18a-b are logically similar to an Ethernet port on the switches 12. Configuration, monitoring, software upgrades, and the like for wireless edge devices appear to the administrator as configuration, monitoring, and upgrades of logical entities called the edge devices on the respective switch 12. These logical devices are in turn loosely bound to respective physical ports 24, based on the ports 24 that the wireless edge devices get plugged into.

There are two primary aspects to the unified, adaptive architecture 10 of FIG. 1. The first is that the APs 18a take on the configuration of the switch port 24 that they are plugged into, i.e., a network administrator simply configures the switch port 24 directly instead of configuring the individual APs 18a. In other words, configuration changes to the wireless LAN edge devices 18a are effected by directly configuring the switch ports 24 to which the wireless LAN APs 18a are connected. This is done, in essence, by programming the switch 12, rather than individual edge devices 18. When an AP 18a is first plugged into a switch port 24, it picks up its configuration from data associated with the switch port 24. If the AP 18a is unplugged from the switch port 24, it loses its configuration. When plugged into another switch port 24, the AP 18a picks up its configuration from the new port 24 that it is plugged into. In effect, the AP 18a adapts to the configuration of the port 24 that it is plugged into. This eases the burden of moving an AP 18a to different switch ports in the network.

The second aspect of the system 10 is that there is no separate software image management for the APs 18a. From an external perspective, the network administrator deals with a single image for the LAN access switch 12 rather than separate images for the switch 12 and APs. If the APs 18a that are connected to the switch 12 require a software image, the switch 12 through its own software image and mechanisms, directly downloads the necessary software into the AP 18a. Using this scheme, different APs 18a could acquire different software depending on what they are expected to do in a given environment. Moreover, software upgrades are effected at the switch level, and it is no longer necessary to individually upgrade software on individual edge devices.

The net result of these two aspects is that a network administrator simply manages the wired LAN access switches 12 and does not have to deal with the configuration and management of the wireless network APs independently. Indeed, plural wireless APs 18a can be configured and managed through the single LAN access switch 12 into which they are plugged.

Although the embodiment of FIG. 1 illustrates treating wireless APs 18a as configurable extensions of switch ports, the invention is not limited to solely the configuration and management of wireless devices. The scope of the invention includes the configuration and management of other network devices, such as voice over IP phones, or the like, that plug into switch ports 24 or wirelessly connect to the network 10 through the APs 18a.

The system 10 includes one or more network switches 12 that communicate with an NMS 20 by way of the network 16. A plurality of network edge devices and wired user stations 18a-b are connected to the ports 24 of the switches 12. Wireless edge devices 18a, such as wireless access points (APs), permit mobile user stations 22 to access the network over one or more wireless channels. The wired devices 18b can be end user devices, such as personal computers, that directly connect to the switch ports using a wired connection, such as a standard Ethernet cable. Additionally or alternatively, the wired devices 18b can also be other devices, such as gateways or routers, that communicate with end user devices 22 over other wired networks (not shown) instead of wireless channels.

The NMS 20 allows network administrators to configure the switches 12, and the edge devices 18a. The network manager 20 can alternatively be connected directly with the switches 12 to bypass the network 16. The network manager 20 can be a commercially-available networked server running custom application software that permits a network administrator to set the configuration information and software images stored in the switches 12 in accordance with the principles disclosed herein.

The switches 12 and network manager 20 can communicate with one another using any suitable access mechanism, such as simple network message protocol (SNMP), Telenet, TCP/IP, HTTP, or the like. Any suitable data network can be used to connect these components. Preferably, the data network 16 is an Ethernet network. In addition, the network 16 can also include other networking components (not shown), such as gateways, routers, additional servers hosting a variety of different applications, as well as links to other networks, such as an enterprise intranet or the public Internet.

The edge devices and wired user stations 18a-b can be any electronic network devices capable of communicating with the network switches 12. Although the exemplary system 10 illustrates the devices 18a-b as being wireless APs 18a and networked computers 18b, the edge devices 18a and wired user stations 18b can also be other networked devices, such as personal digital assistants (PDAs), IP phone, digital cameras, or the like. Additionally/alternatively, the system 10 can comprise only wireless APs 18a as edge devices for communicating with end-user devices 22.

Where the wireless edge device 18a is a wireless AP, it can provide network access to one or more wireless user devices 22, such as personal computers, lap tops, PDAs, phones, cameras, or the like. The wireless user devices 22 and the APs 18a can communicate using a conventional wireless protocol, such as a Wi-Fi protocol based on one of the IEEE 802.11 standards.

Voice over IP phones can be connected to the network 10 as wireless user devices 22 or as wired network devices 18b. With either type of connection, the voice over IP phones can be configured to download images and configuration data from the switch 12 in a manner similar to that used by the wireless edge devices 18a. The voice over IP phones can store the configuration data and images in volatile memory so that when they are powered down, disconnected from the port 24, or lose the signal from the edge devices 18a, the configuration data and images are erased.

Each network switch 12 includes one or more ports 24 corresponding to each of the networked devices 18a-b. The ports 24 permit network communications between the devices 18a-b and the network 16. The network switch 12 can be a commercially-available LAN switch i.e., it can be the network connection point for multiple edge devices and user stations 18a-b, such as an Ethernet switch, programmed with software to conform with the principles the unified, adaptive management and configuration scheme disclosed herein. The software can be coded using any suitable programming language, such C, Java or C++ that is executable on the switch.

Communications between the network 16 and the devices 18a-b pass through the switches 12. The switches 12 can be deployed in secure wiring closets in a campus environment. Any suitable network protocol, such as a data packet scheme, can be used for communications between the network switches 12 and respective devices 18a-b. Preferably, Ethernet is used to communicate messages and information between the switches 12 and their connected devices 18a-b.

Each switch 12 includes an application 26 for entering, storing and applying configuration information, settings and profiles corresponding to the ports 24. The information, settings and profiles are used to configure the devices 18a. Each switch 12 also includes a configuration database (CFG DB) 28 for storing configuration information, settings and profiles. When the configuration information is associated with a particular port, it can then be downloaded to the device 18a when it is connected to the port, as discussed in connection with FIGS. 9-17.

The application 26 has interface software for allowing an administrator to create and/or update the stored configuration information using the network manager 20. In this respect, the application 26 provides seamless management of the wireless network elements. The application 26 includes component software supporting a graphical user interface (GUI) run on either the Windows or Solaris operating systems at the NMS 20. The application 26 also includes component software for allowing an administrator to use SNMP and a command line interface (CLI) to communicate with the switch 12 using a Telenet session in order to set configurations and manage the devices 18a. In addition, the application 26 can also/alternatively allow an administrator to directly access the switch 12 using a telenet or serial session to manage the switch 12 and all the devices 18a connected to the switch 12.

The NMS 20 allows administrators to seamlessly manage the wired and wireless infrastructure. The NMS 20 provides functionality to manage a set of logical elements (vlans, policies, ESS, and the like) and a set of physical elements (Ethernet switches, LACs, APs, RF tunnels and the like). The NMS provides the ability to view the associations between the logical elements and the physical elements, and also configure such associations. The NMS 20 includes a management application (not shown) that allows the administrators to set configuration data and switch ports using the GUI discussed above.

Configuration of the wireless edge devices 18a is done by configuring the wireless properties on the Ethernet port 24. When a device 18a is connected to a specified Ethernet port 24, the device 18a adopts the personality of the port 24. If the device 18a is then moved to a different port 24, it acquires a new personality.

Figure 2:
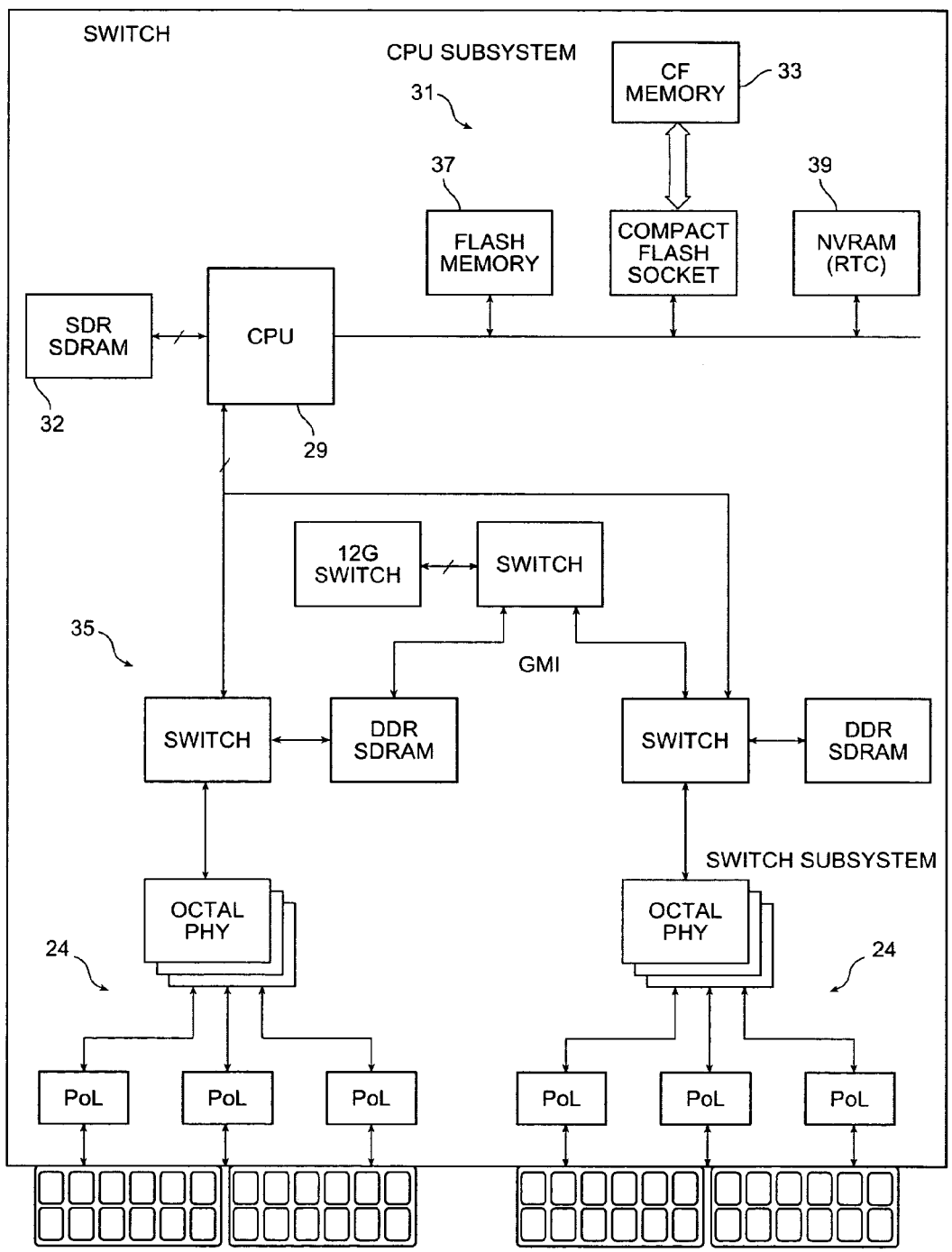
FIG. 2 is a detailed block diagram of exemplary hardware included in the network switch of FIG. 1.

FIG. 2 is a detailed block diagram of exemplary hardware included in each network switch 12 of FIG. 1. The switch 12 is a network switch having interface cards, memory, and a real-time kernel and operating system (OS) for executing one or more software applications to support networked Ethernet communications and to perform in accordance with the various aspects of the invention disclosed herein. The real-time kernel and operating system (RTOS) can be VxWorks®, available from Wind River, Inc. of Alameda, Calif.

The switch 12 includes a central processing unit (CPU) subsystem 31 having a CPU 29 and memories 32, 33, 37, 39 for storing software and data. The CPU 29 is a commercially available microprocessor, such as an Au 1500 processor from Advanced Micro Device, Inc., while the memories devices 32, 33, 37, 39 are commercially-available flash and RAM devices. The switch 12 also includes an Ethernet switch subsystem 35 comprised of standard memory chips, logic and high-speed Ethernet chips available from commercial suppliers such as Broadcom, Inc. The CPU subsystem 31 controls and configures the Ethernet switch subsystem 35.

The application software 26 is stored in the compact flash (CF) memory 33 and executable by the processor 29. The configuration database 28 is also stored in the CF memory 33.

The CF memory 33 also stores at least one access point (AP) software image 34, at least one AP bootrom image 36 and configuration data. The CF memory 33 can also store software and bootrom images and configuration data for voice over IP phones that are managed like the APs. The memory 33 is preferably a conventional compact flash card, such as part no. W7B6064MIXG-T, available from Wintec.

Figure 3:
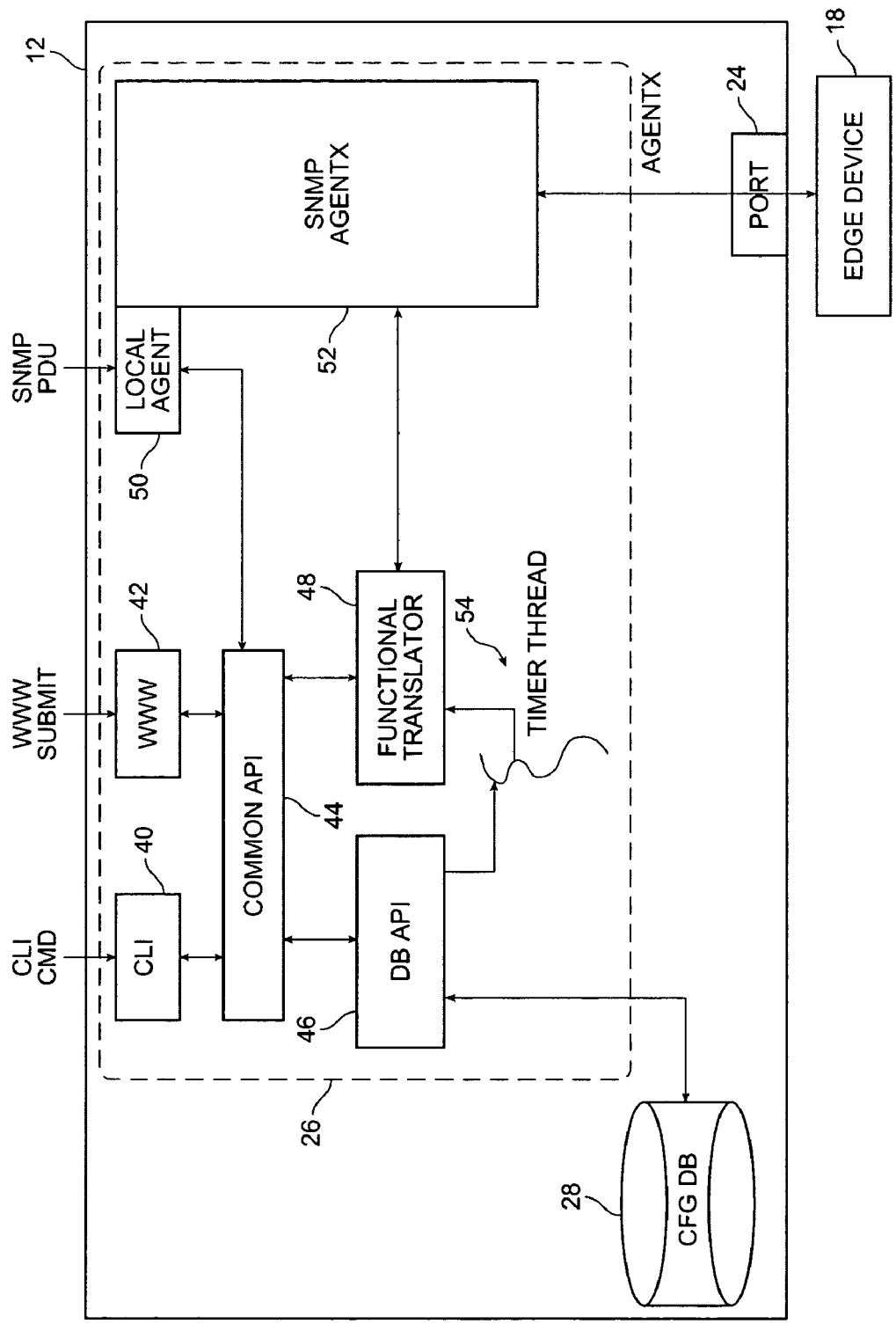
FIG. 3 is a detailed block diagram of software components of the network switch of FIG. 1.

FIG. 3 depicts an exemplary internal software architecture for the network switches 12 of FIG. 1. Essentially, in this architecture, the switch 12 is an Ethernet switch with a simple network message protocol (SNMP) master agent 52 running on the CPU subsystem 31. The SNMP/AgentX 52 is an SNMP manager plus an AgentX server. The SNMP agent 52 listens for SNMP PDUs and dispatches them to the local agent or to the correct subagent based on registration tables.

Each device 18a connected to the switch 12 has an SNMP agent that functions as a subagent to the master SNMP agent 52 on the switch 12. A trivial file transfer protocol (TFTP) server 41 is provided for downloading software images and configuration data to the networked devices 18a.

The unified management scheme of the switch in achieved by implementing SNMP MIBs, a command line interface (CLI) 40 and edge device management web pages on the switch 12, and interfacing with the local data store CFG DB 28 and with the devices 18a using AgentX so that the configuration, monitoring, and software image downloads and upgrades appear to a user as configuration, monitoring, and software downloads, upgrades of the Ethernet port 24, i.e., the devices 18a appear to the administrator as logical extensions of the ports 24. With this architecture, the software application 26 running on the switch 12 includes the CLI 40, the world wide web (www) server and management web pages 42, a common application programming interface (API) 44, a database (DB) API 46 for accessing data from the configuration database (CFG DB) 28, a functional translator 48, a local agent 50, the SNMP agent 52, a TFTP server 41 and a timer thread 54.

The SNMP Agent 52 is an implementation of Envoy from WindRiver Systems, Inc.

The embedded web server 42 is a version of RomPager Web server from Allegro Software.

The common API 44 presents an object-based, transport independent abstraction for configuration information as well as statistics The layers above this API 44 do not know if data is fetched from the local configuration DB 28, or from a remote subagent, using AgentX. The common API 44 provides some generic access mechanisms, such as: Create (obj), Delete(obj), Update (obj), Get(objID), GetN(objIDlist), GetListofObjects(type), and the like.

The functional translator 48 translates the common API/DB API requests into a set of SNMP requests that are used by the AgentX process. The translator 48 contains the selection logic to pass requests to the correct target, as well as the translation from a particular request into the correct object ID (OID) or DB request. The translation occurs from DB API to SNMP OIDs for set requests, and from the Common API to SNMP OIDs for get requests.

The DB API 46 presents an object-based abstraction over locally stored configuration information as well as cached statistics. The Common API 44 accesses the DB API 46 to update configuration for APs 18a. The DB API 46 also communicates with and establishes the timer thread 54, which dispatches requests to the APs 18a.

The DB API 46 dispatches requests to the edge devices 18a.

The CFG DB 28 is a local store of configuration information. The configuration information is associated on a per-port basis as well as per switch basis. As the configuration of each AP or port is updated, changes are reflected here. Data stored in the CFG DB 28 is defined using SNMP MIBs.

Another aspect of the present invention is that templates or profiles can be used to further ease the configuration and management of the wireless LAN APs 78 and other devices connected to switch ports 24. These templates or profiles are stored locally in the CFG DB 28.

1.0 Configuration Profiles

Profiles (templates) are used to remove repetitive configuration tasks. A profile is a grouping of characteristics and configuration parameters that are common across multiple APs 18a and/or other edge devices. The administrator can configure a single profile for all the edge devices that share a common set of parameters. The profile can then be applied to multiple ports on the switch 12 using a single command. When a networked-edge device 18a or a set of devices are plugged into those ports 24, they pick up the configuration specified in the profile. When a profile is changed, the configuration of the data and software on the respective networked device(s) 18a can be done immediately.

Effectively, an administrator no longer has to configure each port 24 individually for all the characteristics required for the wireless LAN access. Any change that needs to be effected across the set of edge devices 18a connected to the switch 12 can be achieved by merely changing the configuration on the single profile that is applied to the ports 24.

Profiles are used for RF parameters, security parameters, media access control (MAC) filters and the like. SNMP tables are implemented to read/set the profile data in the switch 12. When an association is made between a port 24 and a profile, either through SNMP, CLI or Web interface of the application 26, that information is saved on switch 12, and sent through SNMP set commands (over AgentX) to the respective edge device 18a to configure device. There is a set of SNMP tables that are implemented purely as a proxy on the switch 12. These tables fetch the run time data from the edge devices 18a, and represent how the data in the profiles are applied to the edge devices 18a.

The switch 12 includes three different administrator interfaces: a web interface 40, a CLI 42, and SNMP 52. The interfaces 40, 42, 52 allow an administrator to set profiles and configure the ports 24.

2.0 Command Line Interface (CLI)

The CLI 40 includes software for interpreting text command entered by the administrator during a Telenet session. The CLI commands set configurations for ports that are in turn applied to wireless edge devices 18a connected to the ports. They are used to set parameters for RF and security configurations of devices 18a, as well as MAC filtering parameters and image versions to be downloaded to the connected devices 18a. The CLI commands are structured to indicate that the wireless edge devices 18a are extensions of ports 24. A "config wireless port" line command allows profiles and filters to be attached to and removed from the port. Attaching a profile to a port configures the port to, among other things, support a wireless edge device. A port can be moved from one profile to another without being shutdown using the config wireless port command. When a port is first discovered by the switch application 26, it is associated with a default template stored in the CFG DB 28. Once a port has been configured with a profile, if the port is disassociated from it's profile, it will be disabled.

The syntax of various exemplary CLI commands is given below. The example commands below are not an exhaustive list of possible CLI commands and others are contemplated as being within the scope of the invention.

Command: config wireless port <portlist> interface <1|2> rf-profile <name>

This command attaches the ports in the port list to the named RF profile. All ports in the port list can have the same AP version. Using 802.11, each RF-configured port may support one or more radios (A, B, G).

Command: config wireless port <portlist> interface <1|2> security-profile <name>

Description: This command attaches the ports in the port list to the named security profile. All ports in the port list must have the same AP version.

Command: reset wireless port <portlist>

Description: This command forces the wireless ports to reset. In the case of a hard reset the PoE supply is shutdown. In the case of a soft reset a software message is sent to the wireless port forcing the reset.

Command: config wireless port <portnumber> location "String"

Description: Configures the indicated port to have the given location. Location is a free-form string.

Command: enable wireless ports <portlist>

Description: This command moves the wireless port from the disabled state to the enabled state. To succeed, the port is associated with valid security and RF profiles. By default, all ports are in enabled state.

Command: disable wireless ports <portlist>

Description: This command moves the wireless port from the enabled state to the disabled state. When the port is disabled it will not pass traffic.

With respect to RF profiles, the RF profile groups the configuration of RF parameters into a single interface command. The profile can be applied to one or more ports to configure their parameters. Subsequent configuration of an RF profile results in application of the change to all ports associated with that RF profile. All functional ports 24 can be associated with an RF profile.

With a system using 802.11, an RF profile is created for a specific channel (a|g). Applying an RF profile to a port applies changes to that channel's configuration only.

In networks where the switch supports different types and/or brands of edge devices 18a, the switch includes default profiles for the various wireless edge devices 18a it supports.

If no RF profile is applied to the port channel, the default RF template is applied.

The following commands are used to manage rf-profiles located on the switch 12.

Command: create rf-profile <name> mode <A|B>

Description: Creates new profile identified by the string name. Optionally, a second argument can specify the name of an existing profile which is used to copy initial values from.

Command: delete rf-profile <name>

Description: Deletes the named RF profile. The named profile should not be currently attached to any active ports.

Command: config rf-profile <name> <property> <value>

Description: This command sets the value of the property in the named profile to the value specified. Changes take effect immediately, and are propagated to all ports that share this profile.

The ranges and values for the RF properties are listed in Table 1:

TABLE 1

| Parameter | Comments |
| --- | --- |
| mode | This tells the software which ranges are appropriate for speed, channel, etc. A profile with its mode set to g can only be assigned to a g-mode port. |
| Ess-name | This is a human-readable string. Note that the default values are per-channel (a|b|g); their string names reflect this. |
| channel | Here default selection is arbitrary. 802.11A has a different range available than G. If auto is specified the AP will search for a less congested channel. |
| beacon-interval | This is a timeout expressed in Msec. |
| dtim | This is an integer. |
| Fragmentation-length | Integer number of bytes |
| Rts-threshold | This is an integer number of bytes. |
| preamble | Enumerated value, selected from radio button. |
| power | This is an integer value of mW. (defaults are from 802.11 MIB) |

3.0 Web Interface

Figure 4:
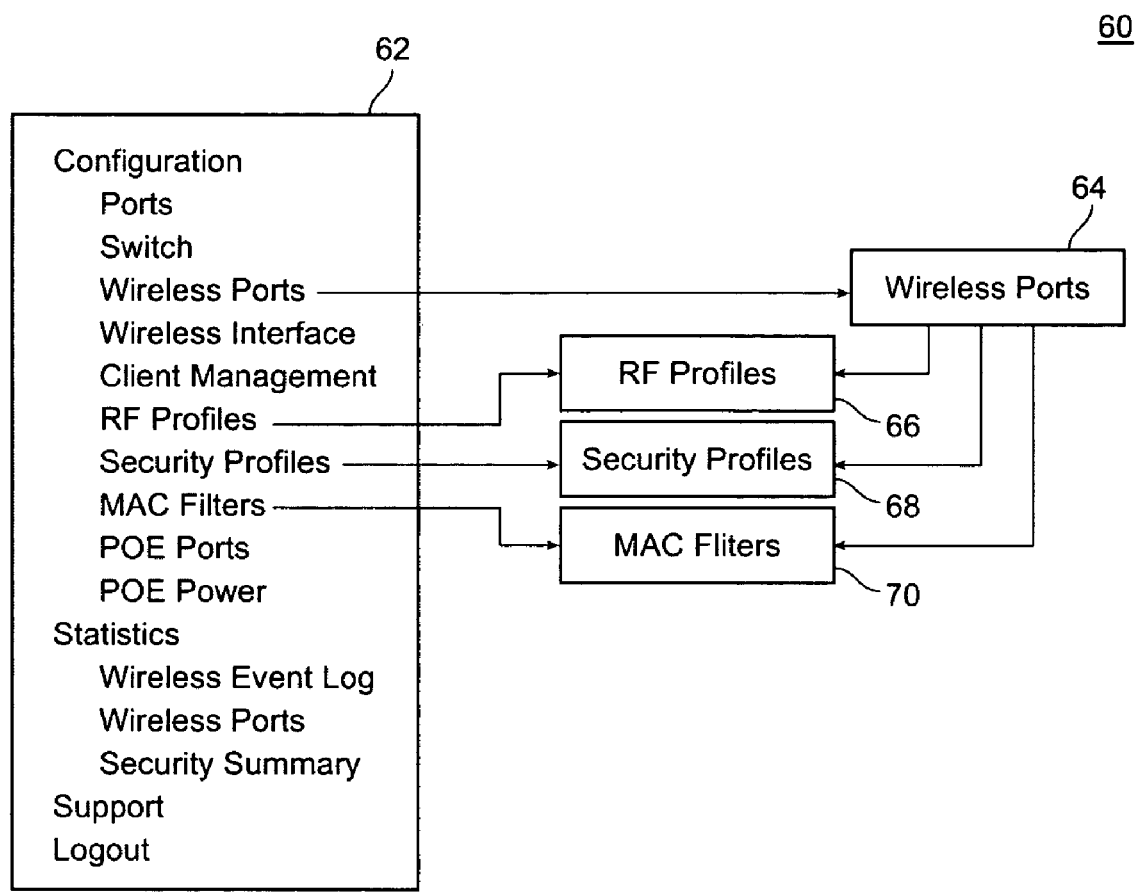
FIG. 4 illustrates the top-level menu of an exemplary graphical user interface (GUI) for configuring a network switch.

FIG. 4 illustrates the top-level menu 62 of an exemplary administrator graphical user interface (GUI) 60 for configuring a network switch 12. The GUI can be a web-based interface. The administrator interface 60 is displayed by the NMS 20, or any other server having a web browser and being connected to web server 42 on the switch 12.

In general, the web interface allows a user to: manage configuration profiles for a wireless port, manage MAC-based filters, view per-port formatted statistics, view current clients of the system, and view current security of the system.

The following links are included in the top-level web page menu 62:

A Configuration Menu, including links for:
Ports—Link to Wired Ports Configuration Page
Switch—Link to Switch Configuration Page
Wireless Ports—Link to Wireless Ports Configuration Page (FIG. 5)
Wireless Interface—Link to Wireless Interface Configuration Page (FIG. 18)
RF Profiles—Link to RF Profiles Page (FIG. 6)
Security Profiles—Link to Security Profiles Page (FIG. 7)
MAC Filters—Link to MAC Filters Page (FIG. 8)
Client Management—Link to Client Management Page (FIG. 19)

POE Power—Link to POE Power Management Page
POE Port—Link to the POE Port Management Page
A Statistics Menu, including links for:
  Wireless Port Statistics—Link to Wireless Port Statistics Page
  Security Summary—Link to Security Summary Page
A Support link.
A Logout Link The web pages are stored locally on the switch 12 and accessed by administrators using a standard web browser via the embedded web server 42. The wired port configuration page (not shown) allows the administrator to set and configure a switch port to support a wired edge device 18b, rather than a wireless edge device 18a.

FIG. 5 shows an exemplary wireless port configuration web page 64 linked to the menu 62. The wireless port configuration page 64 provides the central location for administrator configuration of wireless port parameters corresponding to an 802.11 compliant wireless edge device. There is a per-port list of wireless port configurations. Each entry in the list contains information for the port number, hardware version, serial number, port status (enabled, disabled), port IP address, device location, time out setting, health check flag, bridging flag, and MAC address.

Near the bottom of the page 64 is a form 65 that allows an administrator to configure the ports. To configure a wireless port, the administrator selects the port number. The administrator then enters an IP address, device location, and time out period. Pull-down menus allow the administrator to select health check and bridging. A second form 67 allows the administrator to manage the wireless ports. In this form 67, a pull-down menu allows the administrator to select the port number and then select a management action: reset, port enable, port disable, clear port counter, clear port log. A reset will reboot the wireless port. Disabling is similar to an administrative shutdown; the wireless port will no longer send or receive packets. When the administrator has selected the correct values, he/she presses the submit button, which will validate the new port information. If successful, the port information table at the top of the page will be updated, and/or the selected management function will be taken.

FIG. 6 shows an exemplary RF profile web page 66 linked to the menu 62. RF profiles allow the administrator to configure various RF properties and apply these to a group of one or more ports. Each wireless port can be associated with an RF profile. More than one port may be associated with each RF profile.

Profiles are identified by a string name. To create a new profile the administrator enters a new name and presses the create button. Additionally, when creating a profile the administrator can supply the name of an existing profile to copy the values from. This can save typing if the administrator is just trying to change a few values.

To delete a profile the administrator selects the name of an existing profile from the drop-down and presses the delete button.

To configure an RF profile, the administrator enters the name in the Profile Name text field and presses the get button. The page 66 is redrawn with the current values for the profile.

The current interfaces section is a list of all the ports which are currently linked to this profile. The list is a non-modifiable text string that displays a list. As shown, fillable boxers and check dots are provided to select profile settings and values.

After the administrator has retrieved and modified the values and settings of a particular RF profile, he/she can press the submit button to validate/apply the changes.

FIG. 7 shows an exemplary security profile management web page 68. Although the scope of the invention includes security profiles for configuring any suitable security parameters, the page 68 allows the administrator to configure various WEP and dot1x parameters and apply these to a group of ports. Each wireless port is attached to a security profile. More than one port may be attached to a single security profile.

Profiles are identified by a string name. To create a new profile the administrator enters a new name and presses the create button. Additionally, when creating a profile the administrator can supply the name of an existing profile to copy the values from. This can save typing if the administrator is just trying to change a few values.

To delete a profile the administrator selects the name of an existing profile from the drop-down and presses the delete button.

To configure a security profile the administrator selects an existing profile from the "Profile Name" drop-down. This redraws the page with the currently configured values for the selected profile.

The displayed security profile includes a list of all the ports (current interfaces) which are currently linked to this profile. As shown, fillable boxes and check dots are provided to select security settings and values.

FIG. 8 shows an exemplary MAC-filter management web page 70. The MAC filter page 70 allows the administrator to create, delete and modify MAC filters. A MAC filter is attached to one or more ports and contains a list of MAC address/permit-or-deny pairs. In addition, a default action can be specified to permit or deny all un-specified MACs.

MAC filters are identified by a string name. The administrator can create a new MAC filter by entering a name and pressing the create button. To delete a MAC filter the administrator selects the name from the pull-down list and presses the delete button. The MAC filter default action is configured to be permit or deny via a set of radio buttons.

The association between MAC filters and ports is many to one. As a result, the administrator should first use the wireless port configuration page to unlink the MAC filter before deleting it.

To configure a MAC filter the administrator selects the name of an already existing filter from the pull-down menu and presses the get button. This retrieves the current status of this MAC filter and redraws the screen.

The configuration section is divided into a list of MACs the switch has learned which are candidates for action (the learned list), and a list of MACs and associated actions that the filter already handles. To add a new filter rule the administrator selects one or more MACs from the learned list and presses the permit or deny button. The administrator can also enter a MAC address by hand in the text entry and then press permit or deny.

To remove a filter rule the administrator selects one or more rules from the filter list and presses the remove button.

FIG. 18 shows an exemplary wireless interface configuration web page 75 linked to menu 62 (FIG. 4). The interface configuration page 75 lets administrators set wireless interface parameters on a per interface basis. Each interface bootrom on the list includes the port number, interface number, interface status, channel (A/B/9), transmission speed, power setting, assigned RF profile, and assigned security profile.

Near the bottom of page 75 is a form 76 that allows an administrator to configure the wireless interfaces. To configure a wireless interface, an administrator selects port number and interface number. The administrator then selects the channel, speed, power, and RF and security profiles for the interface. A second form 77 is provided for permitting the administrator to selectively enable, disable or reset a wireless interface.

When an administrator has selected the correct values, he/she presses the submit button, which validates the new interface information. If successful, the interface information is the interface configuration list is updated.

FIG. 19 shows an exemplary client management web page 80 that allows an administrator to disassociate a wireless client that is picked on the basis of its port number and interface number.

4.0 Downloading Images and Configuration Data To Edge Devices

FIGS. 9-17 illustrates details of automatically downloading software images and configuration data stored on the switches 12 to wireless devices 18a when they are connected to a switch port 24. The ability to automatically download images and configuration data allows each device 18a to adapt to the configuration set for the port 24 that the device 18a is connected to.

Figure 9:
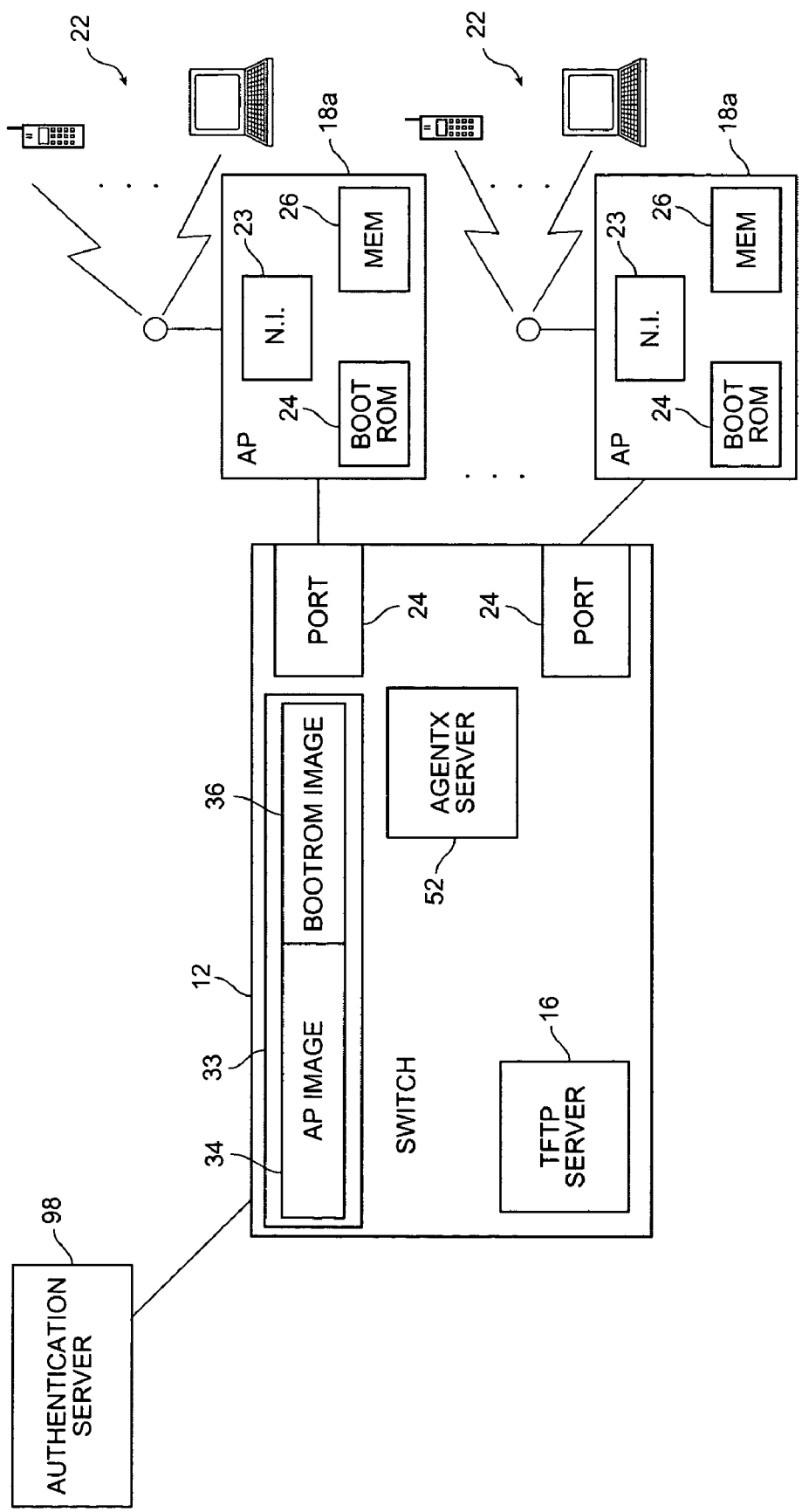
FIG. 9 is a detailed block diagram of exemplary network components in the network of FIG. 1 for downloading a software image from the switch to wireless APs.

FIG. 9 is a detailed block diagram of exemplary network components in the network 10 of FIG. 1 for downloading software images from one of the switches 12 to wireless APs 18a. The switch 12 downloads the information and software to "dumb" APs 18a when they are connected to the switch ports 24. The APs 18a are dumb in the sense that they cannot fully operate on a network without the configuration data and software. The configuration data and software are erased from the APs 18a when they are disconnected from the network 10.

Each AP 18a includes a network interface (NI) 23, a boot ROM (read only memory) 24, and a volatile memory 26. The network interface 23 can be any suitable component for permitting network communication between the switch 12 and the device 18a, and is preferably a commercially-available Ethernet card. The boot ROM 24 can be any programmable ROM device, such as a flash or EEPROM (electrically erasable programmable read only memory), for storing a bootstrap program at the device 18a. The volatile memory can be any suitable type of memory device that is erased when the device 18a is disconnected from the switch 12. For example, the volatile memory 26 can be a dynamic random access memory (DRAM), which is erased when it loses power.

The AP can also include a central processing unit (CPU) (not shown), such as a commercially-available microprocessor, for executing the bootstrap program as well as any software images and applications downloaded from the network 10. The CPU can be connected to boot ROM 24, memory 26, and NI 23. It can also control the NI 23.

Before being connected to the switch 12, the APs 18a are not fully functional. They lack runtime device image (software) and configuration information that is required for them to be fully operational. This software and information is stored on the switch 12 in the network 10 and downloaded to the devices 18a when they are connected to the switch 12. This bootup procedure is described more fully below, in connection with FIG. 10.

The AP software images 34, 36 and AP configuration data can be bundled with self-extracting switch software. During initialization of the switch 12, the bundled software can be loaded onto the switch 12. The bundled software can be compressed and wrapped so that it is self-extracting using a commercially-available software utility. When the bundled software is loaded onto the switch, the images 34, 36 and configuration data are self-extracted and stored in the flash memory.

The compact flash memory 33 has FAT16 file system structure on it. Thus, the AP image 34, AP bootrom 36, as well as other images and data can be stored as separate files on the compact flash file system. Using standard programming techniques, the flash file system can be registered with the VxWorks OS so that the files can be accessed by the OS and applications, such as the TFTP server 16, using standard OS calls.

The TFTP server 16 permits APs 18a to access images 34, 36. The images and data are downloaded to the APs 18a during the power on bootup sequence, as described in further detail below with reference to FIG. 10. The TFTP server 16 can also store other information. The TFTP server 16 is based on RFC 1350 and includes all features suggested in RFC2347.

On the switch 12, the TFTP server 16 operates as follows. The TFTP daemon task is started when switch 12 powers up. A TFTP task is created to process requests from the APs 18a and elsewhere. The server 16 supports multiple instances, i.e., one daemon listens on port 69, and new tasks are created to handle each incoming request. The tftpd PUT is achieved by reading bytes from the file descriptor and writing bytes to the INET UDP socket. The tftpd GET will read data from the socket and write to a file descriptor.

For TFTP opcodes field, the server 16 supports five opcodes:

| | |
|---|---|
| RRQ | read request |
| WRQ | write request |
| DATA | data packet |
| ACK | acknowledgement |
| ERROR | error code |

For the options field, the server 16 uses the default value as specified in RFC 2347.

The format field of the TFTP request is translated. Specifically, the TFTP client on the APs 18a sends netascii and octet. The available formats for TFTP are netascii, ascii, octet, binary, image. The server 16 and clients translate the formats as follows:

| | |
|---|---|
| "netascii" = | "netascii" |
| "ascii" = | "netascii" |
| "octet" = | "octet" |
| "binary" = | "octet" |
| "image" = | "octet" |

In an alternative architecture, the TFTP server 16 can be located elsewhere, outside the switch 12. Also, alternative protocols, other than TFTP can be used to access and transfer the stored images. For example, FTP or BOOTP can be used as alternative transfer mechanisms for downloading the device images from the switch 12 to the APs 18a.

The authentication server 98 can be a conventional RADIUS server that is configured to provide authentication services to the switch 12. The server 18 can be used to authenticate an AP 18a when it is first connected to the network 10, based on a device identifier stored in the device 18a. The switch 12 can include an authenticator operating in conformance with the IEEE 802.1x standard and can use the standard RADIUS protocol to transfer authentication requests and responses to and from the authentication server 98 via the switch 12. In addition, the server 18 can also authenticate end user devices 14 as they log onto the network 10. In an alternative architecture, the authentication server 98 can be included in the switch 12 or located elsewhere in the network 10.

Figure 10:
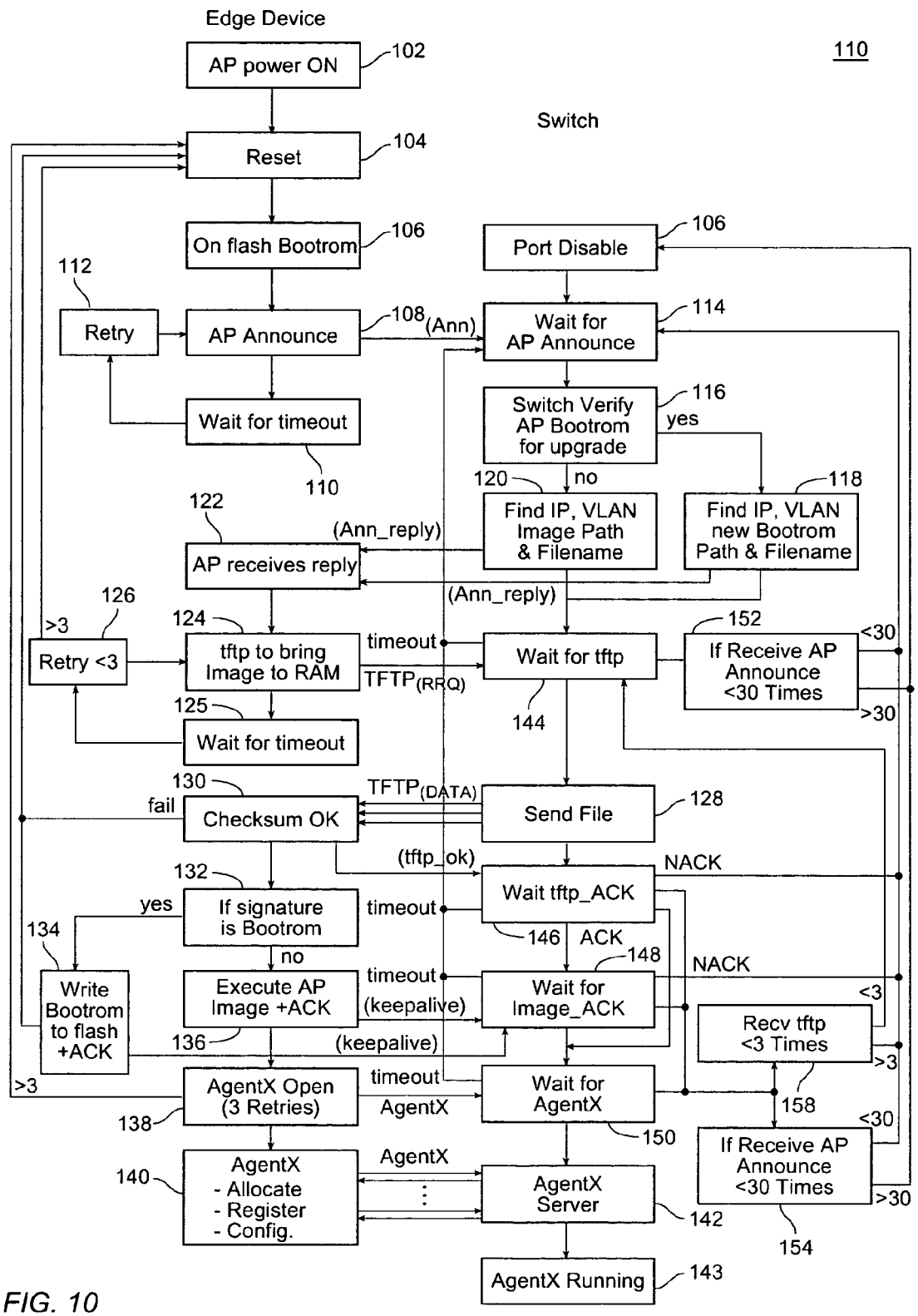
FIG. 10 is a message flow diagram showing an exemplary power-up sequence for the edge devices of FIG. 9.

FIG. 10 is a message flow diagram 50 showing an exemplary power-up sequence for a dumb AP 18a (e.g., an AP) included in the system 10 of FIG. 9. This bootup sequence illustrates an example method of protecting sensitive information by ensuring that it is only temporarily resident on the APs 18a while they are connected to the network 10.

In this bootup process, the AP 18a is first connected to a switch 12 (e.g., a LAC) port using a network cable, such as a CAT-5 cable (step 102). Preferably, the AP 18a does not have an independent power source and takes power from the network cable using a convention scheme such as power over Ethernet (PoE). Using POE, the volatile memory 26, particularly any sensitive information contained therein, is erased when the AP 18a is disconnected from the switch 12. Upon receiving power, the AP 18a resets and starts its own bootup program that is stored in the boot ROM 24 (steps 104-106). When the AP 18a resets, its CPU points to a reset vector at the start of the bootup program. If the AP 18a ever loses power from network cable or connectivity from switch 12, it will restart the whole booting sequence again at the reset vector location.

While executing, the AP bootstrap program sends the AP Announce Message (FIG. 12) to the switch 12 (step 108) and waits for a response (step 110). If the response is not forthcoming, a retry will be used by the AP 18a, if necessary, to avoid the loss of the Announce Message (step 112).

If authentication is successful, the switch 12 will decide the corresponding image(s) for the AP 18a to receive and send out an Announce Reply Message (FIG. 13).

Until it receives the Announce Message, the switch 12 waits (step 114). Upon receiving the Announce Message, the switch 12 determines whether a bootrom upgrade is necessary. (Step 116) If switch 12 determines that a bootrom upgrade is required from the contents of the Announce Message, the TFTP path and filename in the Reply Message is for the bootrom image (step 118), instead of the executable image (step 120). The switch 12 determines whether an upgrade is needed by comparing the bootrom version in the AP Announce Message with the version of the current bootrom program stored on the switch 12.

In the Announce Reply, the switch 12 delivers the switch IP address trivial file transfer protocol (TFTP) server identity, TFTP path/filename and other information that are needed for the AP 18a to download either the bootrom or AP image from the switch (step 122). The contents of this Reply message are discussed in more detail in connection with FIG. 13. The AP 18a then sends out the TFTP request (with retries, if necessary) to download the image and write it directly into AP's volatile memory 26 (e.g., DRAM) (steps 124-126). The TFTP request is encapsulated in the packet format shown in FIG. 11.

In response to the TFTP request, the switch 12 sends one or more TFTP data packets to the AP 18a containing the requested image (step 128) and the goes into a "Wait TFTP_ACK" state (step 146). The TFTP data packets are encapsulated in the packet format shown in FIG. 11.

The new bootrom image is initially downloaded into the AP DRAM 26 and its checksum is computed (step 130) by the AP 18a. If the checksum fails, the AP 18a resets and the bootup sequence restarts.

The AP 18a can verify the checksum of the image received from the TFTP server and send out a TFTP_ACK (FIG. 15) back to switch 12. When the switch 12 receives the ACK, the switch 12 transits to the "Wait for Image_ACK" state (step 148).

Next, the signature in the header is tested to see if it is the signature of a bootrom image or AP image (step 132). If it is the bootrom image, the AP 18a writes the bootrom image from the DRAM into the flash ROM, sends an acknowledge (ACK) to the switch 12 and then resets itself to start the process over, using the newly installed bootrom image to download the executable image (step 134). The ACK to the switch 12 can be sent using a keepalive message that identifies the AP 18a (FIG. 16).

If the image is the AP image, the AP 18a executes the newly downloaded image from the DRAM and ACKs the switch 12 (step 136). The ACK to the switch 12 can be sent using a keepalive message that identifies the AP 18a.

Among other things, the image installs an operating system (OS) including a TCP/IP stack and AgentX client on the AP 18a. The image uses the IP address, gateway and virtual LAN (VLAN) information in the Announce Reply Message to ready the TCP/IP stack. After this step, TCP/IP stack is ready and the AgentX protocol (based on RFC 2741) is used to deliver the configuration information from the AgentX server 52 located on the switch 12 to the AP DRAM 26.

In response to receiving the bootrom or AP image ACK, the switch 12 transits to the "Wait for AgentX" state (step 150).

After the TCP/IP stack is stabilized, AgentX is used to download the configuration information. The AP 18a initiates the process by sending an AgentX.Open request to the AgentX server running on the switch 12 (step 138). The switch 12 follows up by sending an AgentX.open_reply (step 142). This initial message sequence is then follow by one or more transactions of AgentX.Allocate/AgentX.Allocate_Reply and AgentX.Register/AgentX.Register Reply between the AP 18a and switch 12 to agree on supported configuration parameters. (steps 140, 143) Once the parameter set has been agreed on a series of AgentX.Set messages are used to download the configuration information to the AP 18a.

To close the session between the AP and the switch the AgentX.Close message is used. It can be initialized by either the switch 12 or AP 18a. The switch 12 includes a state machine that is intended to remain synchronized with the AP 18a and uses timeout mechanism for corner cases. As shown in FIG. 10, steps 144-150 rely on the timeout mechanism to return the switch 12 to step 114 in the event of an unresponsive AP 18a.

In addition, the switch 12 uses a counter called "Recv AP Announce" to decide if the switch 12 has received too many Announce Messages, for example, over thirty, at certain points in the bootup sequence (steps 152-154). If the switch 12 receives too many AP Announce Messages before it completes the startup process, it disables the port (step 156). The counter will only incremented when switch 12 has time to process a request. When the switch 12 is highly loaded and does not have time to process Announce messages, incoming requests are collapsed and the counter is incremented once.

In a similar fashion, the switch 12 includes a counter called "Recv TFTP" to determine if the switch 12 has received too many TFTP requests from the AP 18a during the process (step 158).

In addition, the switch 12 can have timer between PoE up and the first AP Announce Message. If the switch 12 powers up the AP 18a and does not see the first Announce Message within a predetermined time period, it is assumed that there is something wrong with the AP 18a or the connection, and the switch 12 can power cycle the AP 18a again in an attempt to correct the situation.

The switch 12 configures the radio frequency (RF) profile of the AP 18a according to the IP address and gateway information specified in the Reply Message. (When the switch 12 receives the Announce Message, it replies with the Reply Message, which includes the IP settings). After the Renew_Config message is sent and the IP stack is reset the AP re-opens the AgentX session with the switch 12. This includes sending the AgentX.Open, Alloc and Registration messages. In this case no AgentX.Set messages are sent, as configuration data has remained the same.

FIGS. 11-17 illustrate exemplary formats for messages sent between the APs 18a and the switch 12 during the bootup procedure of FIG. 10. The messages are sent using Ethernet.

Figure 11:
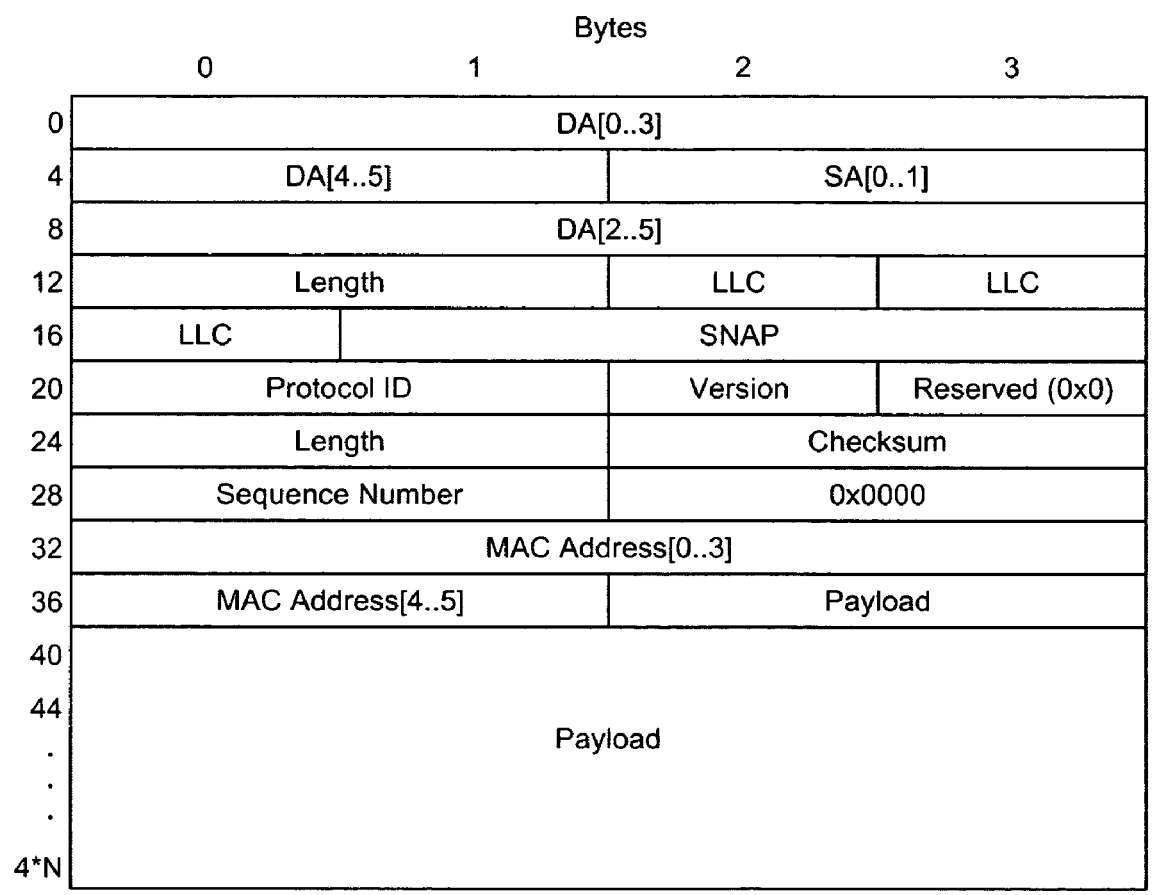

FIG. 11 shows the message format for encapsulating payload messages for transport between the AP 18a and switch 12 over Ethernet. Each payload is encapsulated in an LLC+SNAP header. The header include source address (SA), destination address (DA), the LLC value, SNAP value, and protocol ID, version number, length, checksum, sequence number, and MAC address. The MAC address in the header is the sender's MAC address. The sequence number will be incremented by the sender for every packet sent.

FIGS. 12-17 show details of the message payloads carried in the packet format of FIG. 11 for the messages sent between the switch 12 and AP 18a during the bootup sequence discussed in connection with FIG. 10.

FIG. 12 shows an example of an AP Announce Message. The message contains the message length, AP hardware version (hardware ID, i.e., hardware major and minor revision IDs, and build number), bootrom image version (bootrom major and minor revision IDs, and build number), serial number, AP MAC address, hardware post status, and hardware post OK field. The hardware ID is a 16 byte ASCII string. The AP can send this message every second, until Announce_Reply packet is returned by the switch.

FIG. 13 shows an example of an Announce Reply Message. The message contains the IP address, subnet mask, default gateway and the management VLAN information on which the AP 18a should send the TFTP request. It also provides the "image_type" flag to identify whether the included URL is for the bootrom or AP image. The URL starts with "tftp://" and follows by the IP address of the TFTP server. The filename (or path name) follows. The fields are individually described as follows:

AP IP Address: IP address for the access point.

AP IP mask: mask for AP. For example, 24 means 255.255.255.0

AP default gateway Address: default gateway for the access point.

switch IP Address: The switch IP to which the AP is connected.

AgentX port: After booting up, AP can start AgentX's TCP connection to this port.

Physical SW Port if index: The physical port number on LAN switch that AP is connected to. AgentX can report SNMP trap using this information.

USE_VLAN_TAG: 0: do not use VLAN tag, 1: use VLAN tag.

VLAN Tag: Insert the tag into packets if Use_VLAN_TAG is set to 1.

Keep-alive timer: Timer for AP_KEEP_ALIVE in seconds.

Image type: 0: Boot code, 1:AP runtime image.

Boot URL can be, e.g., tftp://10.0.0.1/Altitude-1.z. It can be a null terminated string.

FIG. 14 shows an example of a Renew_Config Message. The message contains a length, an AP IP address, AP IP mask, VLAN tag, default gateway, switch IP address, agentx port, and physical SW port index, and the other information shown for the AP 18a to use. If no IP is assigned, the current AP IP will be used. If the IP address is specified, then any AgentX connection is shut, the AP IP stack is re-initialized, and AgentX is re-established. Having a new IP in this message usual means that the management VLAN changes. Re-initializing the AP IP stack will move the AP to new management VLAN.

FIG. 15 shows an example of a TFTP_ACK Message. The message contains status information indicating that the TFTP transfer of the bootrom or AP image is complete. The fields are defined as follows:

Image type: 0—Boot ROM. 1—AP

Status: 0: OK, 1: Fail

Retry #: 1-3 number of the TFTP retries.

FIG. 16 shows an example of a keepalive message from the AP 18a to the switch 12. The packet includes information identifying the AP 18a. In response to the packet, the switch 12 updates its internal state. The AP 18a sends outs a keepalive packet every second. If three packets are missed, or if a different AP 18a is identified by the packet, i.e., one that the switch 12 does not already associated with the port 21, then switch 12 resets the AP 18a.

FIG. 17 shows an example of a reset message sent from the switch 12 to the AP 18a. This type of packet instructs the AP 18a to reset. In response to receiving this message, the AP 18a does a soft reset of all interfaces, and its internal software stacks. The message can be sent by an administrator. After the switch 12 sends the reset, it starts a watchdog timer to track the boot-up sequence as its starts over. In the other word, the switch 12 waits for the Announce message and reply with Announce_Reply message. However, if the timer goes off before an Announce message is received, the switch concludes that the AP 18a has not reset itself successfully, and the switch 12 then power cycles the AP 18a through PoE.

While various embodiments of the invention have been described, it will be apparent to those of ordinary skill in the art that many more embodiments and implementations are possible that are within the scope of this invention. For example, any combination of any of the systems or methods described in this disclosure are possible.

What is claimed is:

1. A network switch, comprising:
    a configurable port for connecting either a wireless edge device or a wired device to the switch; and
    a processor for executing an application running on the network switch, for configuring the port to support either a wired device or a wireless edge device, and also enabling the port, when configured to support a wireless edge device, to automatically configure a wireless edge device attached to the port to function as a wireless network access point.

2. The network switch of claim 1, wherein the application permits an administrator to create a profile associated with one or more ports of the network switch.

3. The network switch of claim 1, wherein the application permits an administrator to enter configuration information corresponding to the wireless edge device.

4. The network switch of claim 3, wherein the configuration information includes information selected from the group consisting of radio frequency (RF) parameters, security parameters and a combination of the forgoing parameters.

5. The network switch of claim 3, further comprising:
means for downloading the configuration information to the wireless edge device when the wireless edge device is connected to the port.

6. The network switch of claim 1, further comprising:
a database for storing configuration information associated with the port.

7. The network switch of claim 1, wherein the port is an Ethernet port.

8. The network switch of claim 1, wherein the wired device is a wired edge device.

9. The network switch of claim 1, further comprising:
a memory for storing a software image corresponding to the wireless edge device; and
means for downloading the software image to the wireless edge device when the wireless edge device is connected to the port.

10. A network system, comprising:
a network switch including
a port,
a processor for executing a software application for configuring the port to support a wireless edge device,
a memory for storing configuration information associated with the port and a software image; and;
a wireless edge device including a program for automatically downloading the configuration information and the software image when the wireless edge device is connected to the port, so that the wireless edge device is configured to function as a wireless network access point.

11. The network system of claim 10, wherein the port is configurable to support wired devices and wireless edge devices.

12. The network system of claim 10, wherein the network switch includes a plurality of ports.

13. The network system of claim 12, wherein a profile including the configuration information is associated with one or more ports of the network switch.

14. The network system of claim 10, wherein the configuration information includes information selected from the group consisting of radio frequency (RF) parameters, security parameters and a combination of the forgoing parameters.

15. The network system of claim 10, wherein the port is an Ethernet port.

16. The network system of claim 11, wherein the wired devices are wired edge devices.

17. In a network system, a method of configuring a network switch port and wireless edge device, comprising:
receiving configuration information at a network switch;
storing the configuration at the network switch;
associating the configuration information with a port of the network switch;
configuring the port to support either a wired device or a wireless edge device;
when the port is configured to support a wireless edge device, automatically downloading the configuration information to the wireless edge device when the wireless edge device is connected to the port; and
configuring the wireless edge device based on the downloaded configuration information.

18. The method of claim 17, further comprising:
creating a profile associated with one or more ports of the network switch.

19. The method of claim 17, wherein the configuration information includes information selected from the group consisting of radio frequency (RF) parameters, security parameters and a combination of the forgoing parameters.

20. The method of claim 17, wherein the port is an Ethernet port.

21. The method of claim 17, wherein the wireless edge device is a wireless access point.

22. The method of claim 17, further comprising:
downloading a software image to the wireless edge device when the wireless edge device is connected to the port.

23. A network switch, comprising:
means for connecting to a wireless edge device to the switch; and
means for selectively configuring the connecting means to connect to either a wired device or a wireless edge device; and
means for automatically configuring a wireless edge device attached to the connecting means so that the wireless edge device is able to function as a wireless network access point.

24. The network switch of claim 23, further comprising:
means for creating a profile associated with the connecting means.

25. The network switch of claim 23, further comprising:
means for storing configuration information.

26. The network switch of claim 23, further comprising:
means for downloading configuration information to the wireless edge device when the wireless edge device is attached to the connecting means.

27. The network switch of claim 26, wherein the configuration information includes information selected from the group consisting of radio frequency (RF) parameters, security parameters and a combination of the forgoing parameters.

28. The network switch of claim 23, further comprising:
means for downloading a software image to the wireless edge device when the wireless edge device is attached to the connecting means.

29. A network switch comprising:
one or more ports;
a memory for storing a software image executable by a wireless edge device;
a processor for configuring at least one of the ports to support a wireless edge device; and
an application for automatically downloading the software image to the wireless edge device when the wireless edge device is plugged into the port, thereby configuring the wireless edge device so that it is able to function as a wireless network access point.

30. The network switch of claim 29, wherein the memory stores a plurality of software images and the processor includes means for selectively associating one of the software images with the at least one of the ports.

31. The network switch of claim 29, further comprising means for upgrading the software image.

32. The network switch of claim 31, wherein the processor allows the upgraded software image to be associated with the at least one of the ports.

* * * * *